United States Patent
Iwamoto (10) Patent No.: US 12,541,190 B2
(45) Date of Patent: Feb. 3, 2026

(54) METHOD AND COMPUTER PROGRAM PRODUCT FOR IDENTIFYING ELEMENT WHICH LIMITS THROUGHPUT OF PLATING APPARATUS

(71) Applicant: EBARA CORPORATION, Tokyo (JP)

(72) Inventor: Daiki Iwamoto, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 516 days.

(21) Appl. No.: 18/083,901

(22) Filed: Dec. 19, 2022

(65) Prior Publication Data

US 2023/0205179 A1 Jun. 29, 2023

(30) Foreign Application Priority Data

Dec. 24, 2021 (JP) ................................ 2021-210697

(51) Int. Cl.
*G05B 19/4155* (2006.01)
*C25D 21/10* (2006.01)
*C25D 21/12* (2006.01)

(52) U.S. Cl.
CPC ......... *G05B 19/4155* (2013.01); *C25D 21/10* (2013.01); *C25D 21/12* (2013.01); *G05B 2219/37098* (2013.01)

(58) Field of Classification Search
CPC ...... G05B 19/4155; G05B 2219/37098; C25D 21/10; C25D 21/12
See application file for complete search history.

(56) References Cited

U.S. PATENT DOCUMENTS

| | | | |
|---|---|---|---|
| 6,418,350 B1 * | 7/2002 | Hamidzadeh | G06Q 10/06 700/100 |
| 10,417,613 B1 * | 9/2019 | Brisebois | G06F 21/554 |
| 2015/0253762 A1 | 9/2015 | Nakano et al. | |

FOREIGN PATENT DOCUMENTS

JP 6262137 B2 1/2018

* cited by examiner

*Primary Examiner* — Gary Collins
(74) *Attorney, Agent, or Firm* — BakerHostetler (57) ABSTRACT

An element which limits throughput of a plating apparatus is identified. A method for identifying an element which limits throughput of a plating apparatus is provided. The method comprises: a step for creating a time chart which represents process schedules of plural processing units and one or plural transfer apparatuses; a step for calculating, based on the time chart, at least one of an operation rate and a degree of freedom of taking-out with respect to each of elements comprising the plural processing units and the one or plural transfer apparatuses, wherein the degree of freedom of taking-out represents a degree of freedom with respect to timing when the substrate which has been processed can be taken out of one of the processing units; and a step for displaying, with respect to each of the elements comprising the plural processing units and the one or plural transfer apparatuses, at least one of the calculated operation rate and the calculated degree of freedom of taking-out.

12 Claims, 8 Drawing Sheets

METHOD AND COMPUTER PROGRAM PRODUCT FOR IDENTIFYING ELEMENT WHICH LIMITS THROUGHPUT OF PLATING APPARATUS

CROSS REFERENCE TO RELATED APPLICATION

This application claims priority to Japanese Patent Application No. 2021-210697 filed Dec. 24, 2021, the entire contents of which are hereby incorporated by reference.

TECHNICAL FIELD

The present invention relates to a method and a computer program product for identifying an element which limits throughput of a plating apparatus.

BACKGROUND ART

A plating apparatus comprises various kinds of processing units for processing substrates and one or plural transfer apparatuses for conveying the substrates. In both a stage of designing and a stage of operation of a plating apparatus, an important object that is expected to be attained is to increase the number of substrates which can be processed per unit time by a plating apparatus, i.e., to improve throughput of the plating apparatus.

CITATION LIST

Patent Literature

PTL 1: Japanese Patent Publication No. 6262137

SUMMARY OF INVENTION

Technical Problem

Patent Literature 1 discloses a technique to calculate the rate of operation of a substrate processing apparatus. However, no technique to calculate the rate of operation of each element included in a substrate processing apparatus is mentioned therein.

On the other hand, for example, there is a method wherein an engineer having specialized knowledge performs simulation of a series of actions performed in a plating apparatus and checks the state of operation of each element based on result of the simulation. However, with respect to the above method, the process for identifying a part which influences throughput takes time, and people who can perform such analysis are limited.

Solution to Problem (Mode 1) According to mode 1, a method for identifying, in a plating apparatus comprising plural processing units for processing substrates and one or plural transfer apparatuses for conveying the substrates, an element in elements comprising the processing units and the one or plural transfer apparatuses which limits throughput of the whole plating apparatus is provided, and the method comprises: a step for inputting a set of plating process conditions; a step for creating, based on the set of plating process conditions, a time chart which represents process schedules of the plural processing units and the one or plural transfer apparatuses; a step for calculating, based on the time chart, at least one of an operation rate and a degree of freedom of taking-out with respect to each of elements comprising the plural processing units and the one or plural transfer apparatuses, wherein the degree of freedom of taking-out represents a degree of freedom with respect to timing when the substrate which has been processed can be taken out of one of the processing units; and a step for displaying, with respect to each of the elements comprising the plural processing units and the one or plural transfer apparatuses, at least one of the calculated operation rate and the calculated degree of freedom of taking-out.

(Mode 2) According to mode 2 that comprises the method of the mode 1, the operation rate of the processing unit is calculated based on the sum of substrate processing time spent processing the substrate in the subject processing unit and substrate conveying time spent conveying the substrate between the subject processing unit and a different processing unit by the one or plural transfer apparatuses.

(Mode 3) According to mode 3 that comprises the method of the mode 2, the substrate conveying time includes time from a start of action to take a substrate out of the subject processing unit to completion of action to store the substrate in a processing unit in a subsequent stage following that including the subject processing unit, and time from a start of action to take a next substrate out of a processing unit in a previous stage before that including the subject processing unit to completion of action to store the next substrate in the subject processing unit.

(Mode 4) According to mode 4 that comprises the method of the mode 3, the substrate conveying time comprises time of movement of the one or plural transfer apparatuses from the processing unit in the subsequent stage to the processing unit in the previous stage.

(Mode 5) According to mode 5 that comprises the method of any one of the modes 1-4, the operation rate of the transfer apparatus is calculated based on the sum of lengths of time spent conveying the substrate by the subject transfer apparatus.

(Mode 6) According to mode 6 that comprises the method of any one of the modes 1-5, the degree of freedom of taking-out of the processing unit is calculated based on substrate waiting time from a point in time when processing of the substrate in the subject processing unit is completed to a point in time when it becomes possible to take the substrate out of the subject processing unit.

(Mode 7) According to mode 7 that comprises the method of the mode 6, the degree of freedom of taking-out of the processing unit is calculated based on a difference between the maximum value and the minimum value of the substrate waiting time of the subject processing unit in the time chart.

(Mode 8) According to mode 8 that comprises the method of any one of the modes 1-7, the time chart comprises information relating to timing when each of the plural processing units starts and terminates processing of the substrate.

(Mode 9) According to mode 9 that comprises the method of any one of the modes 1-8, the time chart comprises information relating to timing of a start and timing of an end of movement of each of the one or plural transfer apparatuses from one processing unit to the other processing unit.

(Mode 10) According to mode 10 that comprises the method of the mode 9, the time chart comprises information relating to timing when each of the one or plural transfer apparatuses starts and terminates action for taking the substrate out of the one processing unit, and information relating to timing when each of the one or plural transfer apparatuses starts and terminates action for storing the substrate in the other processing unit.

(Mode 11) According to mode 11 that comprises the method of any one of the modes 1-10, each of the operation rate and the degree of freedom of taking-out is displayed with respect to each of the elements in the plating apparatus by using a heat map or a brightness map.

(Mode 12) According to mode 12, a computer program product which is constructed to make a processor in a computer perform steps for identifying, in a plating apparatus comprising plural processing units for processing substrates and one or plural transfer apparatuses for conveying the substrates, an element in elements comprising the processing units and the one or plural transfer apparatuses which limits throughput of the whole plating apparatus is provided, and the steps comprise: a step for receiving input of a set of plating process conditions; a step for creating, based on the set of plating process conditions, a time chart which represents process schedules of the plural processing units and the one or plural transfer apparatuses; a step for calculating, based on the time chart, at least one of an operation rate and a degree of freedom of taking-out with respect to each of the elements comprising the plural processing units and the one or plural transfer apparatuses, wherein the degree of freedom of taking-out represents a degree of freedom with respect to timing when the substrate which has been processed can be taken out of one of the processing units; and a step for displaying, with respect to each of the elements comprising the plural processing units and the one or plural transfer apparatuses, at least one of the calculated operation rate and the calculated degree of freedom of taking-out on a display.

BRIEF DESCRIPTION OF DRAWINGS

FIG. 4 shows an example of a time chart according to an embodiment of the present invention.

DESCRIPTION OF EMBODIMENTS

In the following description, embodiments of the present invention will be explained with reference to the figures. In the figures that will be explained below, a reference symbol that is the same as that assigned to one component is assigned to the other component which is the same as or corresponds to the one component, and overlapping explanation of these components will be omitted.

Figure 1:
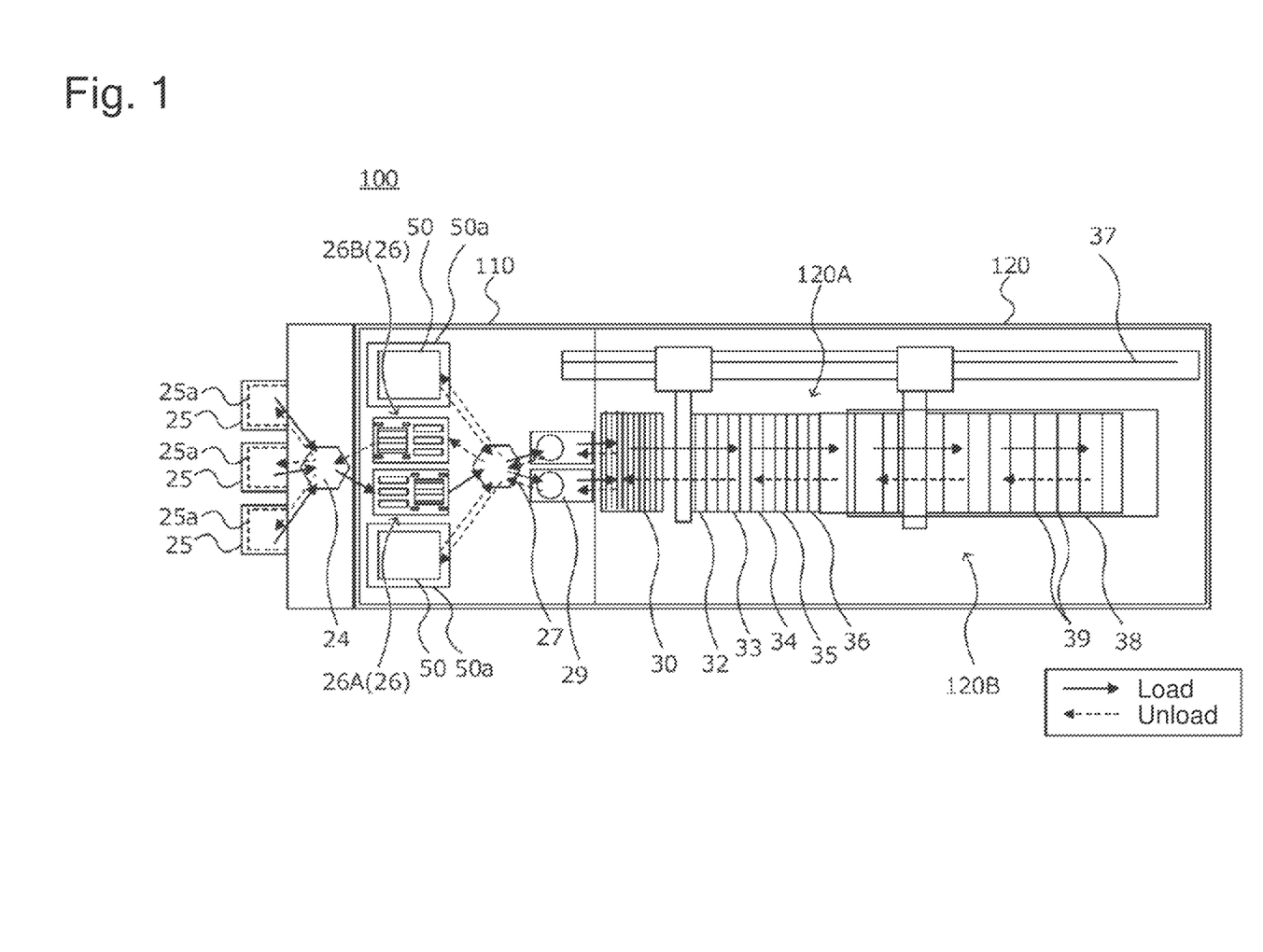
FIG. 1 is a general layout drawing of a plating apparatus according to an embodiment of the present invention.

FIG. 1 is a general layout drawing of a plating apparatus 100 according to an embodiment of the present invention. The plating apparatus 100 can roughly be divided into some components, specifically, a load/unload module 110 which loads a substrate into a substrate holder (which is not shown in the figure) or unloads a substrate from a substrate holder, a processing module 120 which processes a substrate, and a washing module 50a. Further, the processing module 120 comprises a pre-processing/post-processing module 120A which performs pre-processing and post-processing of a substrate, and a plating processing module 120B which performs plating processing of a substrate.

The load/unload module 110 comprises a handling stage 26, a substrate transfer device 27, and a fixing station 29. For example, in the present embodiment, the load/unload module 110 comprises two handling stages, specifically, a handling stage 26A for loading, which handles a substrate to which no process has been applied, and a handling stage 26B for unloading, which handles a substrate with respect to which a process applied thereto has been completed. In the present embodiment, the construction of the handling stage 26A for loading is the same as that of the handling stage 26B for unloading, and they are arranged in such a manner that the directions thereof are 180-degree opposite from each other. In this regard, the handling stage 26 is not limited to that comprising the handling stage 26A for loading and the handling stage 26B for unloading, and the handling stages may be used without discrimination, i.e., without setting one of them to be a handling stage for loading and the other of them to be a handling stage for unloading. Further, in the present embodiment, the load/unload module 110 comprises two fixing stations 29. The mechanisms of the two fixing stations 29 are identical with each other; and one, that is free (i.e., that is not handling a substrate), of them is used. In this regard, one or three or more handling stage/stages 26 and one or three or more fixing station/stations 29 may be installed according to the space in the plating apparatus 100.

Substrates are conveyed from plural cassette tables 25 (for example, three in FIG. 1) to the handling stage 26 (the handling stage 26A for loading) via a robot 24. The cassette table 25 is provided with a cassette 25a in which a substrate is stored. For example, the cassette is a FOUP. The handling stage 26 is constructed in such manner that it adjusts (aligns) the position and the direction of a substrate put thereon. A substrate transfer device 27 is arranged in a position between the handling stage 26 and the fixing station 29 for conveying a substrate between them. The substrate transfer device 27 is constructed to convey a substrate between the handling stage 26, the fixing station 29, and the washing module 50a. Further, a stocker 30, which is used for storing substrate holders, is installed in a position near the fixing station 29.

The washing module 50a comprises a washing device 50 which cleans a substrate, with respect to which a plating process applied thereto has been completed, and dries it. The substrate transfer device 27 is constructed to convey a substrate, with respect to which a plating process applied thereto has been completed, to the washing device 50, and take the washed substrate out of the washing device 50. Thereafter, the washed substrate is delivered to the handling stage 26 (the handling stage 26B for unloading) by the substrate transfer device 27, and returned to the cassette 25a via the robot 24.

The pre-processing/post-processing module 120A comprises a pre-wet tank 32, a pre-soak tank 33, a pre-rinse tank 34, a blow tank 35, and a rinse tank 36. In the pre-wet tank 32, a substrate is soaked into pure water. In the pre-soak tank 33, an oxide film on a surface of a conductive layer, such as a seed layer and so on, formed on a surface of a substrate is removed by etching. In the pre-rinse tank 34, a substrate, with respect to which a pre-soaking process applied thereto has been completed, is washed together with a substrate holder by using cleaning liquid (pure water or the like). In the blow tank 35, liquid removal of a washed substrate is performed. In the rinse tank 36, a plated substrate is washed together with a substrate holder by using cleaning liquid. In this regard, the construction of the pre-processing/post-processing module 120A in the plating apparatus 100 is a mere example, so that the construction of the pre-processing/post-processing module 120A in the plating apparatus 100 is not limited thereto, and a different construction may be adopted.

The plating processing module 120B is constructed, for example, in such a manner that plural plating tanks 39 are housed in the inside of an overflow tank 38. Each plating tank 39 is constructed in such a manner that it stores a single substrate therein, and soaks the substrate into plating liquid held in the inside thereof and applies plating such as copper plating or the like to a surface of the substrate.

The plating apparatus 100 comprises a transporter 37 which adopts, for example, a linear motor system, and is arranged in a position on a side of the pre-processing/post-processing module 120A and the plating processing module 120B for conveying a substrate holder together with a substrate. The transporter 37 is constructed to convey a substrate holder between the fixing station 29, the stocker 30, the pre-wet tank 32, the pre-soak tank 33, the pre-rinse tank 34, the blow tank 35, the rinse tank 36, and the plating tank 39.

An example of a series of plating processes performed by the plating apparatus 100 will be explained. First, by the robot 24, a single substrate is taken out of the cassette 25a loaded in the cassette table 25; and the substrate is conveyed to the handling stage 26 (the handling stage 26A for loading). The handling stage 26 aligns the position and the direction of the conveyed substrate with a predetermined position and a predetermined direction. The substrate, with respect to which the position and the direction have been aligned in the handling stage 26, is conveyed to the fixing station 29 by the substrate transfer device 27.

On the other hand, a substrate holder stored in the stocker 30 is conveyed to the fixing station 29 by the transporter 37, and put horizontally on the fixing station 29. Thereafter, the substrate conveyed by the substrate transfer device 27 is put on the substrate holder which is in the above state, and the substrate and the substrate holder are coupled with each other.

Next, the substrate holder, which holds the substrate, is grasped by the transporter 37 to store it in the pre-wet tank 32. Next, the substrate holder, which holds the substrate with respect to which the process applied thereto in the pre-wet tank 32 has been completed, is conveyed to the pre-soak tank 33 by the transporter 37 to etch an oxide film on the substrate in the pre-soak tank 33. Following thereto, the substrate holder, which holds the above substrate, is conveyed to the pre-rinse tank 34 to water-wash the surface of the substrate by pure water stored in the pre-rinse tank 34.

The substrate holder, which holds the substrate with respect to which the water-washing process applied thereto has been completed, is conveyed from the pre-rinse tank 34 to the plating processing module 120B by the transporter 37 to store it in the plating tank 39 which is filled with plating liquid. The transporter 37 repeats the above procedures sequentially to store respective substrate holders, which hold respective substrates, in respective plating tanks 39 in the processing module 120 sequentially.

In each of the plating tanks 39, a surface of the substrate is plated by applying a plating voltage between an anode (which is not shown in the figure) in the plating tank 39 and the substrate.

After completion of plating, the substrate holder, which holds the plated substrate, is grasped by the transporter 37 and conveyed to the rinse tank 36 to soak it into pure water stored in the rinse tank 36 to wash the surface of the substrate by the pure water. Next, the substrate holder is conveyed to the blow tank 35 by the transporter 37 to remove water droplets remaining on the substrate holder by air-blowing or the like. Thereafter, the substrate holder is conveyed to the fixing station 29 by the transporter 37.

In the fixing station 29, the processed substrate is taken out of the substrate holder by the substrate transfer device 27, and conveyed to the washing device 50 in the washing module 50a. The washing device 50 washes and dries the substrate with respect to which the plating process applied thereto has been completed. The dried substrate is delivered to the handling stage 26 (the handling stage 26B for unloading) by the substrate transfer device 27, and returned to the cassette 25a via the robot 24.

Figure 2:
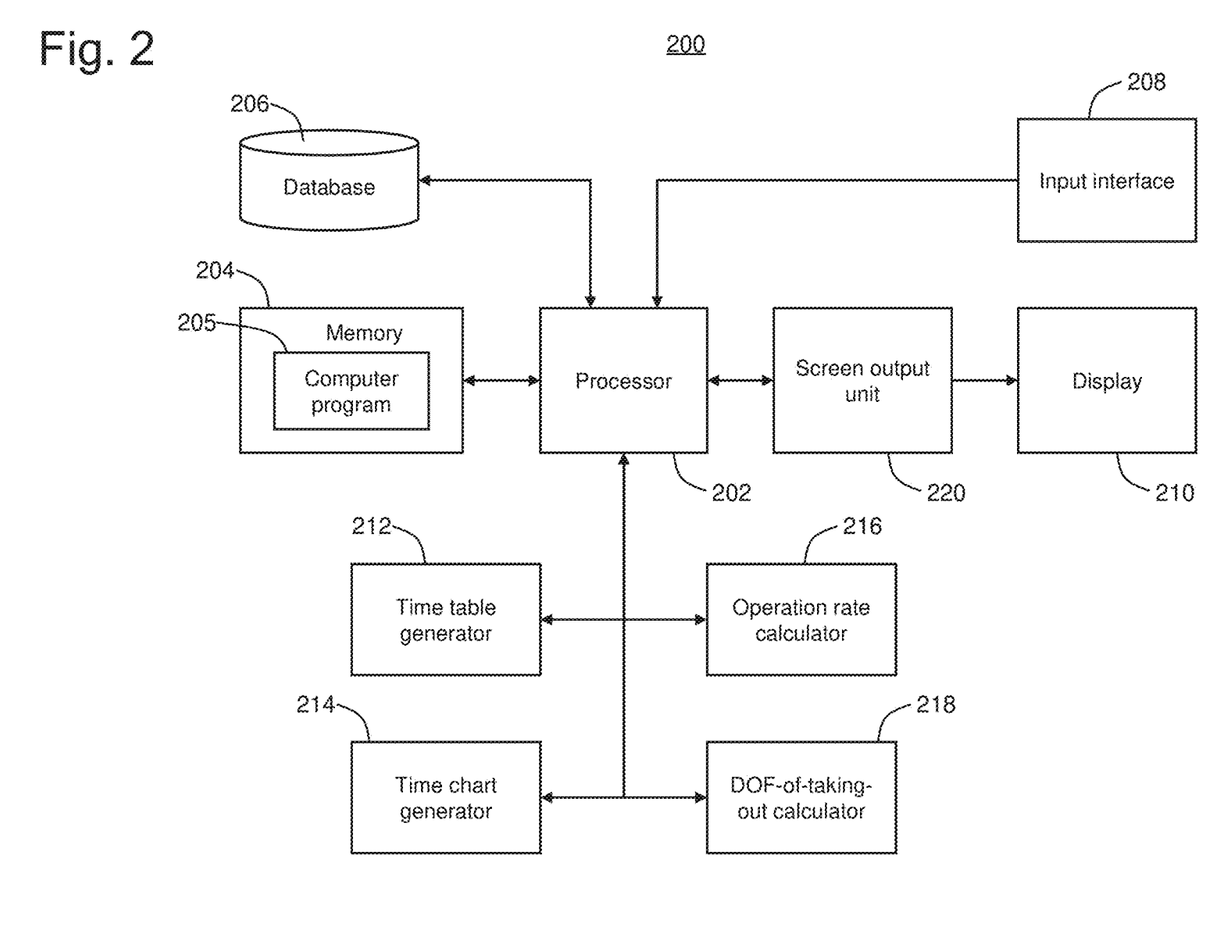
FIG. 2 is a configuration diagram of an example data processing device used for implementing a method according to an embodiment of the present invention.
Figure 3:
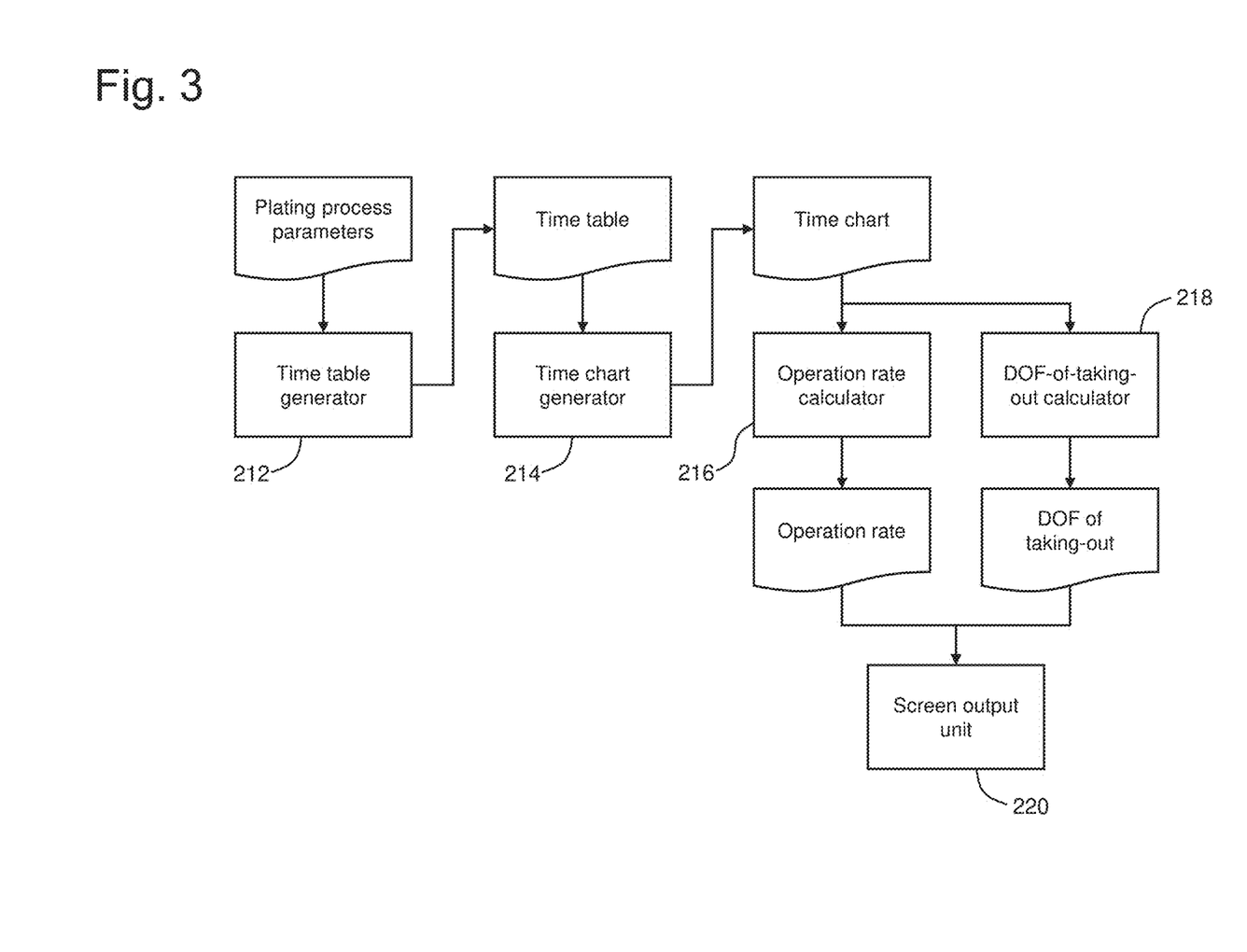
FIG. 3 is a figure showing an outline of data processing in a data processing device according to an embodiment of the present invention.

FIG. 2 is a configuration diagram of an example data processing device 200 used for implementing a method according to an embodiment of the present invention. FIG. 3 is a figure showing an outline of data processing in the example data processing device 200 in FIG. 2. The data processing device 200 may be a computer in various forms of computers such as a desk-top computer, a notebook computer, a server in a network, and so on. As shown in the figure, the data processing device 200 comprises a processor 202, a memory 204, a database 206, an input interface 208, and a display 210. The database 206 and the display 210 may be external devices which are connected to the data processing device 200 via a network or a communication cable. The memory 204 stores a computer program 205 which is constructed to be able to realize a method according to an embodiment of the present invention. The processor 202 reads the computer program 205 out of the memory 204 and executes it. As a result, the method according to the embodiment of the present invention is implemented in the data processing device 200.

Further, the data processing device 200 comprises a time table generator 212, a time chart generator 214, an operation rate calculator 216, a degree-of-freedom-of-taking-out calculator 218, and a screen output unit 220. The above respective components may be functional blocks which are realized by executing the computer program 205 by the processor 202. The time table generator 212, the time chart generator 214, the operation rate calculator 216, the degree-of-freedom-of-taking-out calculator 218, and the screen output unit 220 are constructed to be able to implement, by working cooperatively with one another, the method according to the embodiment of the present invention.

The time table generator 212 is constructed to create, based on plating process parameters, a time table which represents process schedules of transfer apparatuses (for example, the robot 24, the substrate transfer device 27, and the transporter 37 shown in FIG. 1) included in the plating apparatus 100. The plating process parameters used for creating the time table comprise information relating to the construction of the plating apparatus 100 and information relating to process conditions. For example, the above information may be stored in the database 206 in advance, and inputted from the database 206 to the time table generator 212. In a different construction, part of the above information may be inputted via an input interface 208 by a user of the plating apparatus 100. For example, the information relating to the construction of the plating apparatus 100 comprises: information of arrangement of the processing units (for example, the pre-wet tank 32, the pre-soak tank 33, the pre-rinse tank 34, the blow tank 35, the rinse tank 36, and the plural plating tanks 39 shown in FIG. 1) and the transfer apparatuses included in the plating apparatus 100; the operation time that is spent storing/taking, by a transfer apparatus, a substrate which is an object in/out of each processing unit; the travel time that is spent when a transfer apparatus moves between respective processing units; the ranges of movement of respective transfer apparatuses; the order of processes of a substrate in plural processing units; the limited time during that a substrate, with respect to which a process applied thereto in a processing unit has been completed, can wait in the inside of the processing unit; and so on. The information relating to process conditions of the plating apparatus 100 comprises process time that is set as time for processing a substrate in each processing unit. The time table generator 212 can create, by performing simulation of operation of the plating apparatus 100 by using the above various plating process parameters, a time table which shows processing units from which substrates are conveyed and processing units to which the substrates are conveyed from the above processing units, and timing when substrates are conveyed by respective transfer apparatuses.

The time chart generator 214 is constructed to create, based on the time table generated in the time table generator 212, a time chart of the plating apparatus 100. The time chart of the plating apparatus 100 comprises process schedules of respective processing units, in addition to the process schedules of the transfer apparatuses. Although the time table generator 212 and the time chart generator 214 are shown as separate components in FIG. 2 and FIG. 3, the time table generator 212 and the time chart generator 214 may be integrated with each other to form a single component for creating a time chart directly from the plating process parameters.

FIG. 4 shows an example of a created time chart. In the present example, it is supposed that the plating apparatus 100 comprises four processing units, specifically, a unit U1, a unit U2, a unit U3, and a unit U4, and three transfer apparatuses, specifically, a transfer apparatus T1, a transfer apparatus T2, and a transfer apparatus T3. For example, the unit U1, the unit U2, the unit U3, and the unit U4 may be those corresponding to some of the pre-wet tank 32, the pre-soak tank 33, the pre-rinse tank 34, the blow tank 35, the rinse tank 36, and the plating tank 39 in FIG. 1, respectively. Further, for example, each of the transfer apparatus T1, the transfer apparatus T2, and the transfer apparatus T3 may correspond to one of the robot 24, the substrate transfer device 27, and the transporter 37.

Figure 5:
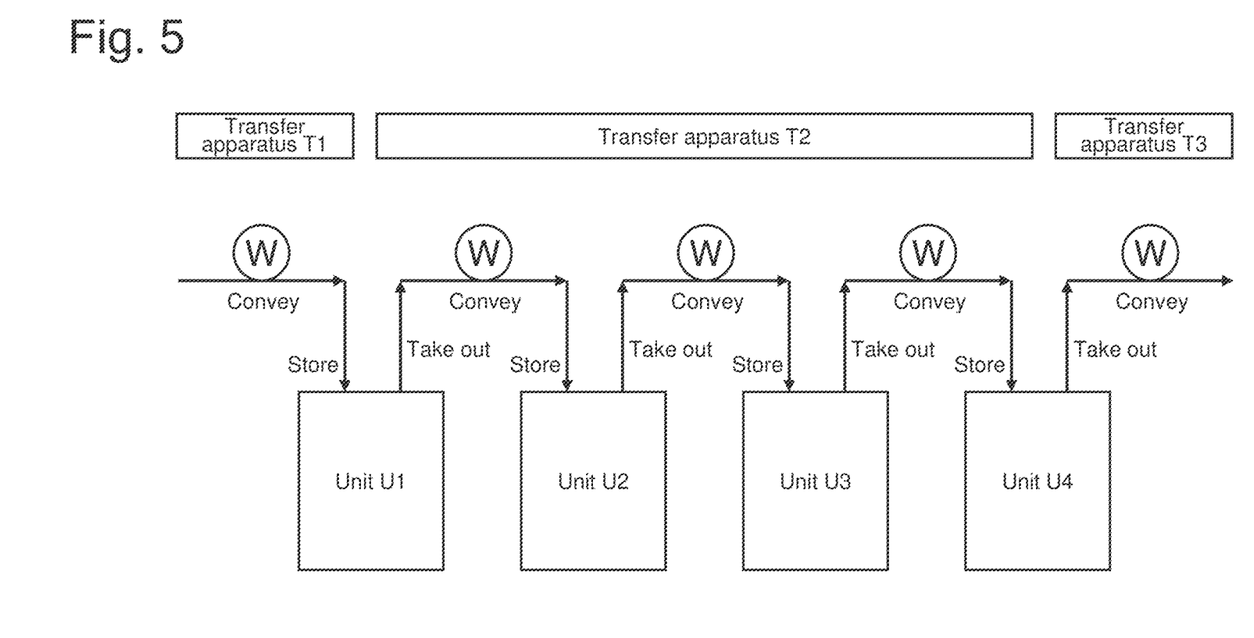
FIG. 5 is a schematic diagram showing interrelationship between each of processing units and each of transfer apparatuses in a plating apparatus, in the example of the time chart in FIG. 4.

FIG. 5 is a schematic diagram showing interrelationship between respective processing units and respective transfer apparatuses in the plating apparatus 100, in the example of the time chart in FIG. 4. The transfer apparatus T1 conveys a substrate W to the unit U1 (for example, from a different processing unit which is not shown in FIG. 5) and stores it in the unit U1. The substrate W is processed in the unit U1. After completion of the process in the unit U1, the transfer apparatus T2 takes the substrate W out of the unit U1, conveys it to the unit U2, and stores it in the unit U2. The substrate W is processed in the unit U2. In a manner similar to that explained above, the substrate W is conveyed by the transfer apparatus T2 to the unit U3 and the unit U4 sequentially, and processed in the unit U3 and the unit U4. After completion of the process in the unit U4, the transfer unit T3 takes the substrate W out of the unit U4, and further conveys it to a processing unit which is in a subsequent stage and is not shown in the figure.

Figure 6:
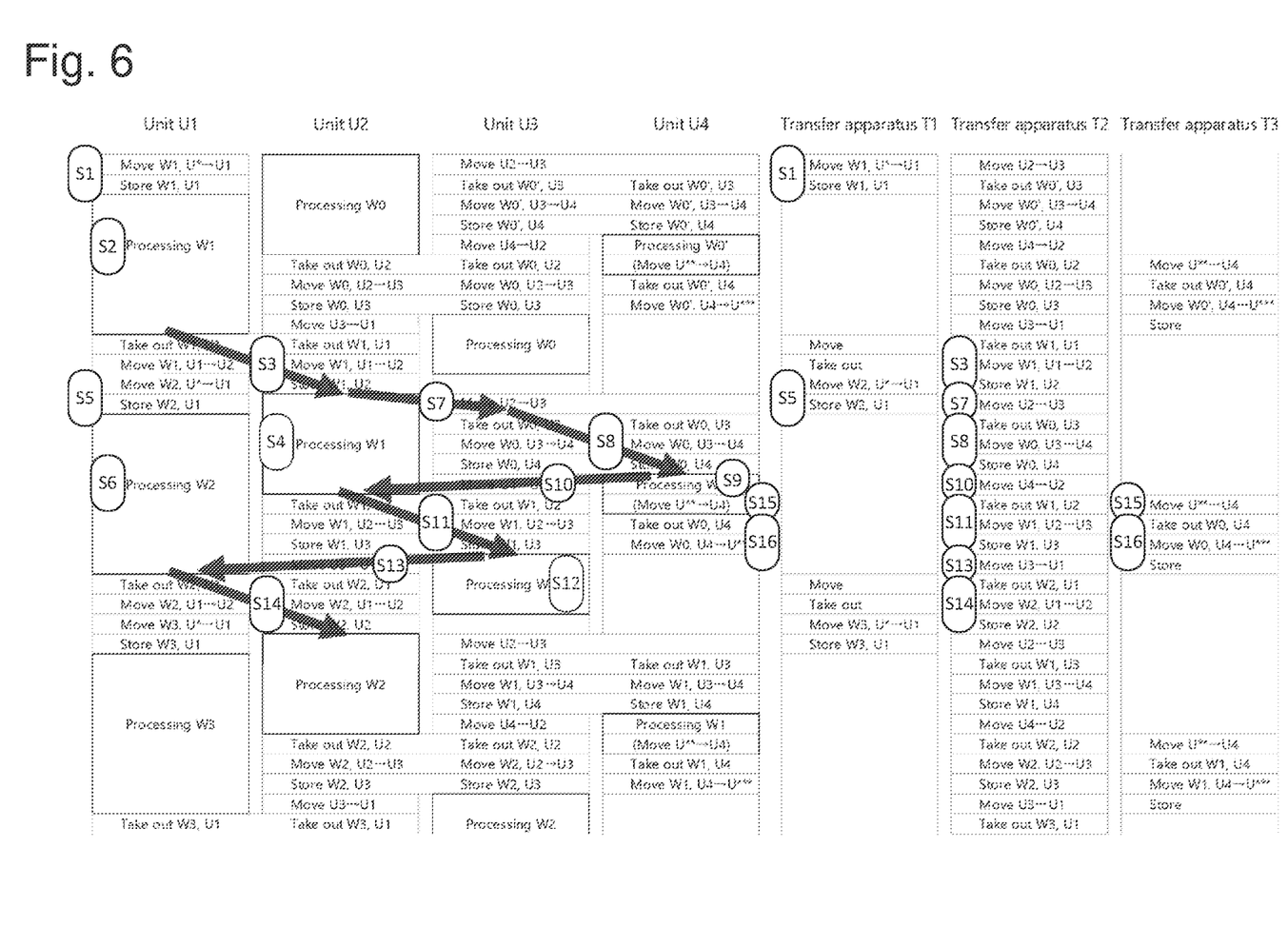
FIG. 6 is a figure that includes the time chart in FIG. 4 with insertion of arrows representing actions of transfer apparatuses.

FIG. 6 is a figure that includes the time chart in FIG. 4 with insertion of arrows representing actions (moving paths) of the transfer apparatus 2. In this regard, it should be reminded that each of FIGS. 4-6 is that showing an actual construction of the plating apparatus 100 in a simplified form, for convenience and easiness of understanding of the explanation. Although it is needless to state, the number of the processing units and transfer apparatuses and the arrangement thereof in these figures can be changed appropriately to suit an actual construction of the plating apparatus 100.

The processing schedules of the respective processing units and the respective transfer apparatuses in the plating apparatus 100 described in the example time chart will be explained in detail by simultaneously referring to FIGS. 4-6. The time chart shows a state wherein the respective processing units process five substrates W0', W0, W1, W2, and W3 which are serially put therein, and illustration of substrates which precede and follow the five substrates are omitted in the figures.

The transfer apparatus T1 conveys the substrate W1 to the unit U1 (from a unit which is not shown in the figure), and stores it in the unit U1 (symbol S1 in FIG. 6). The unit U1 processes the substrate W1 (symbol S2). After completion of processing of the substrate W1 in the unit U1, the transfer apparatus T2 takes the substrate W1 out of the unit U1, conveys it to the unit U2, and stores it in the unit U2 (symbol S3). The unit U2 processes the substrate W1 (symbol S4). Also, at timing when the transfer apparatus T2 is moved from the unit U1 to the unit U2, the transfer apparatus T1 conveys the next substrate W2 to the unit U1, and stores it in the unit U1 (symbol S5). The unit U1 similarly processes the substrate W2 (symbol S6).

On the other hand, the transfer apparatus T2 which have conveyed the substrate W1 to the unit U2 moves to the unit U3 (symbol S7) subsequently for receiving the substrate W0, which is a substrate previous to the above substrate and with respect to which the process applied thereto in the unit U3 has been completed. In this point, regarding a period of time from completion of processing of the substrate W0 in the unit U3 to arrival of the transfer apparatus T2 at the unit U3, the processed substrate W0 has to wait for the above period of time in the unit U3. The above period of time is shown as a blank part in the time chart. After arriving at the unit U3, the transfer apparatus T2 takes the substrate W0 out of the unit U3, conveys it to the unit U4, and stores it in the unit U4 (symbol S8). The unit U4 processes the substrate W0 (symbol S9).

Next, the transfer apparatus T2, which has conveyed the substrate W0 to the unit U4, moves to the unit U2 (symbol S10). As already shown by the symbol S4, the unit U2 is processing the substrate W1. After completion of processing of the substrate W1 in the unit U2, the transfer apparatus T2 takes the substrate W1 out of the unit U2, conveys it to the unit U3, and stores it in the unit U3 (symbol S11). The unit U3 processes the substrate W1 (symbol S12).

Next, the transfer apparatus T2, which has conveyed the substrate W1 to the unit U3, moves to the unit U1 (symbol S13). The unit U1 is processing the second substrate W2 (the above symbol S6); and, after completion of processing of the substrate W2 in the unit U1, the transfer apparatus T2 takes the substrate W2 out of the unit U1, and conveys it to the unit U2 (symbol S14). In the following procedure, respective processes similar to those explained above are repeated with respect to the substrate W2 in the respective units.

In the unit U4, processing of the previous substrate W0 is being performed therein (the above symbol S9); and the transfer apparatus T3 moves to the unit U4 in advance (symbol S15) to meet the timing when processing of the substrate W0 in the unit U4 is completed. After completion of the processing of the substrate W0 in the unit U4, the transfer apparatus T3 takes the substrate W0 out of the unit U4 and conveys it to a unit in a subsequent stage which is not shown in the figure (symbol S16). Thereafter, the unit U4 enters a waiting state and keeps it (a blank part in the time chart) until the transfer apparatus T2 starts action for conveying a next substrate (the substrate W1) from the unit U3 to the unit U4.

Here, FIGS. 2 and 3 are referred to again; and the operation rate calculator 216 is constructed to calculate operation rates of the processing units and the transfer apparatuses of the plating apparatus 100, respectively, based on the time chart generated by the time chart generator 214. The operation rate of each of the processing units or the transfer apparatuses is defined as a ratio of time relating to operation of the processing unit or the transfer apparatus relative to total operation time of the plating apparatus 100. The "total operation time of the plating apparatus 100" may be total time that is spent completing processing of plural substrates which are objects of processing in the plating apparatus 100, i.e., a period of time from a start of processing of a first substrate in the plural substrates to an end of processing of a last substrate in the plural substrates. In a different construction, in the case that a processing schedule of a group of successive substrates is repeated cyclically like the example in the time chart in FIG. 4 (that is, in the case that the process schedule of each of the processing units and the transfer apparatuses with respect to certain N successive substrates has a pattern that is the same as the pattern of the process schedule of each of the processing units and the transfer apparatuses with respect to next N successive substrates that follows the certain N successive substrates), the "total operation time of the plating apparatus 100" may be defined as time of such a cycle.

The "time relating to operation of a processing unit" may be defined, for example, as the sum of i) substrate processing time $\Delta TA$ spent processing a substrate W in the subject processing unit and ii) substrate conveying time $\Delta TB$ spent conveying, by a transfer apparatus, a substrate W between the subject processing unit and a different processing unit. The substrate conveying time $\Delta TB$ may comprise at least one of ii-1) time $\Delta TB1$ that is a period of time from a start of action for taking a processed substrate W out of the subject processing unit to completion of action for storing the substrate W in a processing unit in a stage subsequent to that including the subject processing unit, ii-2) time $\Delta TB2$ that is spent moving a transfer apparatus (from any one of processing units) to the processing unit in the stage previous to that including the subject processing unit, and ii-3) time $\Delta TB3$ that is a period of time from a start of action for taking a next substrate W out of the processing unit in the stage previous to that including the subject processing unit to completion of action for storing the next substrate W in the subject processing unit. Each of the time $\Delta TB1$ and the time $\Delta TB3$ may be the sum of time spent completing some actions by a transfer apparatus, i.e., the sum of time spent taking a substrate W out of a processing unit, time spent conveying the taken-out substrate W to a next processing unit, and time spent storing the conveyed substrate W in the processing unit. In this regard, although a transfer apparatus moves between processing units without grasping a substrate in the time $\Delta TB2$, it is reasonable to include the time $\Delta TB2$ in the substrate conveying time $\Delta TB$, since the above movement is that for preparation for supplying a next substrate to a processing unit with respect to which calculation is performed.

The "time relating to operation of a transfer apparatus" may be defined, for example, as the sum of iii) time $\Delta TC$ spent conveying, by the above transfer apparatus, a substrate and iv) time $\Delta TD$ spent moving the above transfer apparatus between processing units without grasping a substrate W. The time $\Delta TC$ may be the sum of time spent completing some actions by a transfer apparatus, i.e., the sum of time spent taking a substrate W out of a processing unit, time spent conveying the taken-out substrate W to a next processing unit, and time spent storing the conveyed substrate W in the processing unit. In this regard, the time $\Delta TD$ in item iv) is the same as the time $\Delta TB2$ in above-explained item ii-2). As explained above, although a transfer apparatus does not grasp a substrate W in the above movement, it is practical to include it in the "time relating to operation" since the above movement is that for preparation for next action, i.e., conveying of a substrate.

Figure 7:
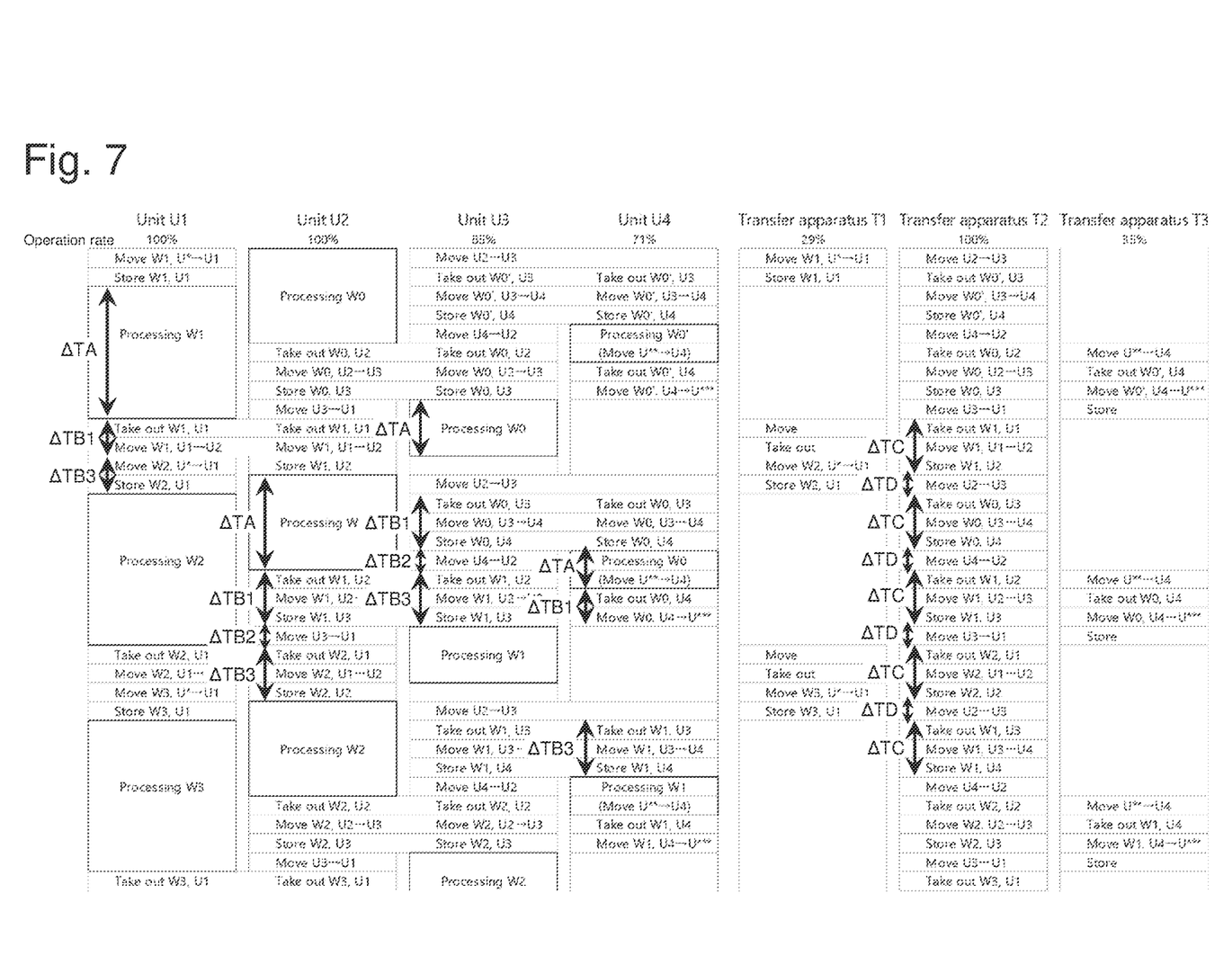
FIG. 7 is a figure that includes the time chart in FIG. 4 wherein each of lengths of time spent calculating the rate of operation is illustrated.

FIG. 7 is a figure that includes the time chart in FIG. 4 wherein respective lengths of the time $\Delta TA$, $\Delta TB1$, $\Delta TB2$, $\Delta TB3$, $\Delta TC$, and $\Delta TD$ spent calculating the rates of operation are illustrated. In the case of the example in the time chart in FIG. 4 wherein a processing schedule of a group of successive substrates is repeated cyclically, respective lengths of the time $\Delta TA$, $\Delta TB1$, $\Delta TB2$, $\Delta TB3$, $\Delta TC$, and $\Delta TD$ may be calculated with respect to a single cycle in repeated cycles.

As can be understood from the above definition of the operation rate and FIG. 7, the operation rate of each of the units U1 and U2 is calculated as 100% in the example of the above time chart. Regarding each of the units U3 and U4, since the sum of the time $\Delta TA$, $\Delta TB1$, $\Delta TB2$, and $\Delta TB3$ is shorter than the time $\Delta T$ of the single cycle, the operation rate thereof is calculated as that less than 100% (for example, 60-90%). Further, the operation rate of the transfer apparatus T2 is calculated as 100%, and, on the other hand, the operation rate of each of the transfer apparatuses T1 and T3 is calculated as that less than 100% (for example, 20-40%).

In this manner, the operation rate of each of the processing units and the transfer apparatuses in the plating apparatus 100 is calculated in the operation rate calculator 216. By analyzing the values of the operation rates, an element/elements, in various elements (the processing units and the transfer apparatuses) in the plating apparatus 100, which affects/affect the throughput of the plating apparatus 100 can be identified.

Here, FIGS. 2 and 3 are referred to again; and the degree-of-freedom-of-taking-out calculator 208 is constructed to calculate, based on the time chart created by the time chart generator 214, a degree of freedom of taking-out with respect to each of the processing units in the plating apparatus 100. For maximizing the throughput of the whole plating apparatus 100, it is important to increase an operation rate of a processing unit with respect to which the throughput is the lowest, in the plural processing units in the plating apparatus 100, as much as possible. For achieving the above object, it is necessary to adjust the processing schedule of each of the elements in the plating apparatus 100 in such a manner that, at timing when processing of a substrate is completed in a certain processing unit (for example, the unit U4) having the smallest throughput such as that explained above, the processed substrate is taken out of the certain processing unit, and, following thereto, a next substrate is conveyed from a processing unit (for example, the unit U3) in a previous stage to the certain processing unit (the unit U4) and stored therein. At the time, in the processing unit (the unit U3) in the previous stage, even if processing of the substrate has been completed, the processed substrate is not taken out of the processing unit right away, and is forced to wait for a while in the processing unit until the above timing. The degree of allowable adjustment of timing when a processed substrate is taken out of each processing unit, as explained above, is defined as a degree of freedom of taking-out.

Figure 8:
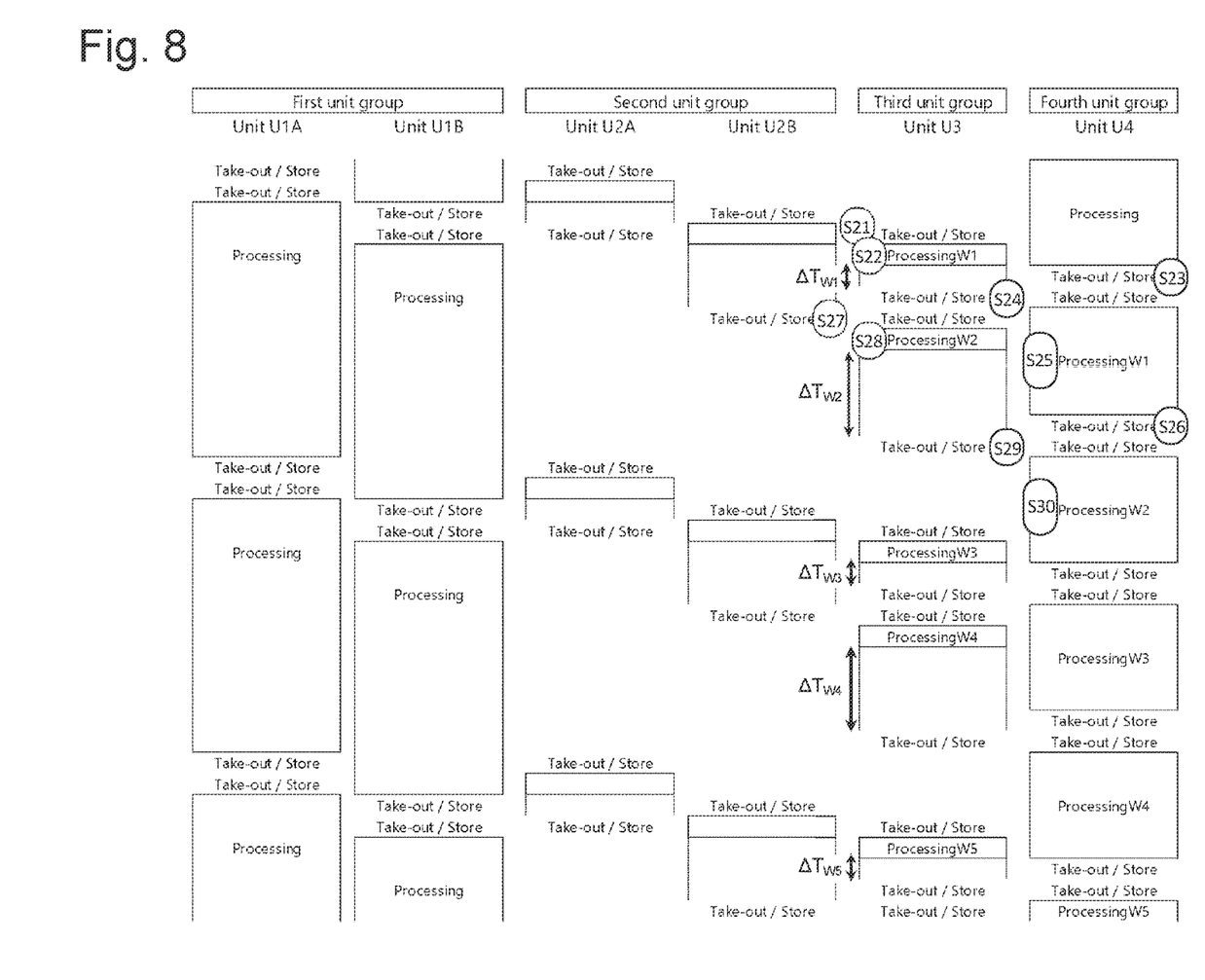
FIG. 8 is a figure showing an example of a different time chart used for explaining the degree of freedom of taking-out.

FIG. 8 is a figure showing an example of a different time chart used for explaining, in more tangible manner, the degree of freedom of taking-out. In the example, it is supposed that the plating apparatus 100 comprises a unit U1A, a unit U1B, a unit U2A, a unit U2B, a unit U3, and a unit U4. It should be reminded that the transfer apparatuses are omitted in FIG. 8. The unit U1A and the unit U1B are processing units which perform the same process (for example, a pre-soak process), and form a first unit group. The unit U2A and the unit U2B are processing units which perform the same process (for example, a plating process), and form a second unit group. Each of the third unit group and the fourth unit group includes a single processing unit only (the unit U3, the unit U4). A substrate is conveyed to the first unit group, the second unit group, the third unit group, and the fourth unit group serially and processed therein. In each of the first unit group and the second unit group, one of two units included in the unit group (for example, a unit which is free) is used to process a substrate.

A tangible example of a degree of freedom of taking-out will be explained in relation to FIG. 8 by focusing on the unit U3. A substrate W1 is conveyed from the unit U2A to the unit U3, and stored in the unit U3 (symbol S21). The substrate W1 is processed in the unit U3 (symbol S22). At the time when processing of the substrate W1 is completed in the unit U3, action to take a previous substrate W0 out of the unit U4 in the subsequent stage (symbol S23) has not yet been completed; accordingly, the substrate W1 is forced to wait in the unit U3 (a blank part). The waiting time, i.e., the length of time of the blank part, is defined as ΔTW1. After completion of action to take the substrate W0 out of the unit U4 in the subsequent stage, action to take the substrate W1 out of the unit U3 is allowed to be performed; and the substrate W1 is taken out of the unit U3, conveyed to the unit U4, and stored in the unit U4 (symbol S24). The substrate W1 is processed in the unit U4 (symbol S25), and, thereafter, taken out of the unit U4 (symbol S26).

On the other hand, although processing of a second substrate W2 in the unit U2B has been completed, the substrate W2 has to wait in the unit U2B (a blank part), until action to take the substrate W1 out of the unit U3 (the above symbol S24) is completed. After completion of the action to take the substrate W1 out of the unit U3, the substrate W2 is taken out of the unit U2B, conveyed to the unit U3, and stored in the unit U3 (symbol S27). The substrate W2 is processed in the unit U3 (symbol S28).

Similar to the above-explained case of the substrate W1, at the time when processing of the substrate W2 is completed in the unit U3, the previous substrate W1 is being processed in the unit U4 in the subsequent stage (symbol S25) and action to take the substrate W1 out thereof has not yet been completed; accordingly, the substrate W2 is forced to wait in the unit U3 (a blank part). The waiting time has a length of time ΔTW2 that is different from the waiting time ΔTW1 relating to the case of the substrate W1. After completion of action to take the substrate W1 out of the unit U4 in the subsequent stage, the substrate W2 is taken out of the unit U3, conveyed to the unit U4, and stored in the unit U4 (symbol S29). The substrate W2 is processed in the unit U4 (symbol S30).

In the following procedure, in a manner similar to the above manner, substrates W3, W4, W5, and so on are processed sequentially. The respective lengths of time ΔTWi (i=1, 2, 3, . . . ) that the respective substrates have to wait in the unit U3 may be different from one another according to temporal relative relationship between the substrate processing in the unit U3 and the substrate processing in the unit U4. The fluctuation range of the lengths of the waiting time ΔTWi relating to respective substrates represents the adjustable range of timing when a substrate is take out of a processing unit (the unit U3 in the present case), i.e., the "degree of freedom of taking-out." Accordingly, the degree of freedom of taking-out of a certain processing unit (for example, the unit U3) can be defined as a value based on a difference between the maximum value and the minimum value of the waiting time ΔTWi in the certain processing unit. For example, with respect to each processing unit, the degree of freedom of taking-out may be defined by the following formula:

(Degree of freedom of taking-out)=((Maximum value of waiting time Δ$TWi$)−(Minimum value of waiting time Δ$TWi$))/(Maximum waiting time)

In this regard, for example, the "maximum waiting time" may be the maximum value of the waiting time ΔTWi in all processing units.

In the manner explained above, the degree of freedom of taking-out of each processing unit in the plating apparatus 100 is calculated in the degree-of-freedom-of-taking-out calculator 208. The degree of freedom of taking-out represents, when the value thereof is small, a state that adjustability with respect to timing when a substrate is taken out of a certain processing unit (for example, the unit U3) is low; and, in such a case, it is difficult to realize a high operation rate in a processing unit (for example, the unit U4) in a subsequent stage. Thus, by analyzing the values of the degrees of freedom of taking-out of respective processing units, a processing unit which interferes with improvement of the throughput of the plating apparatus 100 can be identified.

In FIGS. 2 and 3, the screen output unit 220 generates, based on the operation rates of the respective processing units and the respective transfer apparatuses and the degrees of freedom of taking-out of the respective processing units that have been calculated as explained above, a GUI (graphical user interface) screen and outputs it to the display 210. For example, the GUI screen may be created by superimposing, on a screen which schematically shows the plating apparatus 100 (for example, such as that shown in FIG. 1), an image (for example, a heat map, a brightness map, or the like) which visually represents the calculated operation rates or the calculated degrees of freedom of taking-out of the respective elements in the plating apparatus 100. A user of the plating apparatus 100 can check, via the GUI screen displayed on the display 210, whether the respective operation rates or the respective degrees of freedom of taking-out of the respective elements are high/low, and can take action, such as reconsidering of the recipes and/or process conditions of the plating apparatus 100, as necessary.

In the above description, embodiments of the present invention have been explained based on some examples; and, in this regard, the above embodiments of the present invention are those used for facilitating understanding of the present invention, and are not those used for limiting the present invention. It is obvious that the present invention can be changed or modified without departing from the scope of the gist thereof, and that the present invention includes equivalents thereof. Further, it is possible to arbitrarily combine components or omit a component(s) disclosed in the claims and the specification, within the scope that at least part of the above-stated problems can be solved or within the scope that at least part of advantageous effect can be obtained.

REFERENCE SIGNS LIST

24 Robot
25 Cassette table
25a Cassette
26 Handling stage
27 Substrate transfer device
29 Fixing station
30 Stocker
32 Pre-wet tank
33 Pre-soak tank
34 Pre-rinse tank
35 Blow tank
36 Rinse tank
37 Transporter
38 Overflow tank
39 Plating tank
50 Washing device
50a Washing module
100 Plating apparatus
110 Load/unload module
120 Processing module
120A Pre-processing/post-processing module
120B Plating processing module
200 Data processing device
202 Processor
204 Memory
205 Computer program
206 Database
208 Input interface
210 Display
212 Time table generator
214 Time chart generator
216 Operation rate calculator
218 Degree-of-freedom-of-taking-out calculator
220 Screen output unit

What is claimed is:

1. A method for identifying, in a plating apparatus comprising plural processing units for processing substrates and one or plural transfer apparatuses for conveying the substrates, an element in elements comprising the processing units and the one or plural transfer apparatuses which limits throughput of the whole plating apparatus, comprising:
   a step for inputting a set of plating process conditions;
   a step for creating, based on the set of plating process conditions, a time chart which represents process schedules of the plural processing units and the one or plural transfer apparatuses;
   a step for calculating, based on the time chart, at least one of an operation rate and a degree of freedom of taking-out with respect to each of elements comprising the plural processing units and the one or plural transfer apparatuses, wherein the operation rate of the processing unit or the transfer apparatus is defined as a ratio of time relating to operation of the processing unit or the transfer apparatus relative to total operation time of the plating apparatus, wherein the degree of freedom of taking-out represents a degree of freedom with respect to timing when the substrate which has been processed can be taken out of one of the processing units; and
   a step for displaying, with respect to each of the elements comprising the plural processing units and the one or plural transfer apparatuses, at least one of the calculated operation rate and the calculated degree of freedom of taking-out.

2. The method according to claim 1, wherein the operation rate of the processing unit is calculated based on the sum of substrate processing time spent processing the substrate in the subject processing unit and substrate conveying time spent conveying the substrate between the subject processing unit and a different processing unit by the one or plural transfer apparatuses.

3. The method according to claim 2, wherein the substrate conveying time includes time from a start of action to take a substrate out of the subject processing unit to completion of action to store the substrate in a processing unit in a subsequent stage following that including the subject processing unit, and time from a start of action to take a next substrate out of a processing unit in a previous stage before that including the subject processing unit to completion of action to store the next substrate in the subject processing unit.

4. The method according to claim 3, wherein the substrate conveying time comprises time of movement of the one or plural transfer apparatuses from the processing unit in the subsequent stage to the processing unit in the previous stage.

5. The method according to claim 1, wherein the operation rate of the transfer apparatus is calculated based on the sum of lengths of time spent conveying the substrate by the subject transfer apparatus.

6. The method according to claim 1, wherein the degree of freedom of taking-out of the processing unit is calculated based on substrate waiting time from a point in time when processing of the substrate in the subject processing unit is completed to a point in time when it becomes possible to take the substrate out of the subject processing unit.

7. The method according to claim 6, wherein the degree of freedom of taking-out of the processing unit is calculated based on a difference between the maximum value and the minimum value of the substrate waiting time of the subject processing unit in the time chart.

8. The method according to claim 1, wherein the time chart comprises information relating to timing when each of the plural processing units starts and terminates processing of the substrate.

9. The method according to claim 1, wherein the time chart comprises information relating to timing of a start and timing of an end of movement of each of the one or plural transfer apparatuses from one processing unit to the other processing unit.

10. The method according to claim 9, wherein the time chart comprises information relating to timing when each of the one or plural transfer apparatuses starts and terminates action for taking the substrate out of the one processing unit, and information relating to timing when each of the one or plural transfer apparatuses starts and terminates action for storing the substrate in the other processing unit.

11. The method according to claim 1, wherein each of the operation rate and the degree of freedom of taking-out is displayed with respect to each of the elements in the plating apparatus by using a heat map or a brightness map.

12. A computer program product which is constructed to make a processor in a computer perform steps for identifying, in a plating apparatus comprising plural processing units for processing substrates and one or plural transfer apparatuses for conveying the substrates, an element in elements comprising the processing units and the one or plural transfer apparatuses which limits throughput of the whole plating apparatus, wherein the steps comprise:

a step for receiving input of a set of plating process conditions;

a step for creating, based on the set of plating process conditions, a time chart which represents process schedules of the plural processing units and the one or plural transfer apparatuses;

a step for calculating, based on the time chart, at least one of an operation rate and a degree of freedom of taking-out with respect to each of the elements comprising the plural processing units and the one or plural transfer apparatuses, wherein the operation rate of the processing unit or the transfer apparatus is defined as a ratio of time relating to operation of the processing unit or the transfer apparatus relative to total operation time of the plating apparatus, wherein the degree of freedom of taking-out represents a degree of freedom with respect to timing when the substrate which has been processed can be taken out of one of the processing units; and a step for displaying, with respect to each of the elements comprising the plural processing units and the one or plural transfer apparatuses, at least one of the calculated operation rate and the calculated degree of freedom of taking-out on a display.

\* \* \* \* \*